United States Patent
Caretta et al.

(10) Patent No.: US 8,936,058 B2
(45) Date of Patent: *Jan. 20, 2015

(54) METHOD AND APPARATUS FOR MANUFACTURING DIFFERENT TYPES OF TYRES

(75) Inventors: Renato Caretta, Gallarate (IT); Fiorenzo Mariani, Biassono (IT)

(73) Assignee: Pirelli Pneumatici S.p.A., Milan (IT)

( * ) Notice: Subject to any disclaimer, the term of this patent is extended or adjusted under 35 U.S.C. 154(b) by 1455 days.

This patent is subject to a terminal disclaimer.

(21) Appl. No.: 11/315,298

(22) Filed: Dec. 23, 2005

(65) Prior Publication Data

US 2006/0096695 A1     May 11, 2006

Related U.S. Application Data

(63) Continuation of application No. 10/132,128, filed on Apr. 26, 2002, now Pat. No. 7,005,023, which is a continuation of application No. PCT/EP00/10443, filed on Oct. 24, 2000.

(60) Provisional application No. 60/173,518, filed on Dec. 29, 1999.

(30) Foreign Application Priority Data

Oct. 29, 1999    (EP) .................................... 99830685

(51) Int. Cl.
     *B29D 30/10*      (2006.01)
     *B29D 30/00*      (2006.01)
     *B29C 37/00*      (2006.01)

(52) U.S. Cl.
     CPC ............ *B29D 30/0016* (2013.01); *B29D 30/00* (2013.01); *B29D 30/005* (2013.01); *B29C 2037/80* (2013.01); *B29D 2030/105* (2013.01)
     USPC .......................... 156/396; 156/111; 425/34.1

(58) Field of Classification Search
     USPC ............ 156/111, 396, 117, 123; 425/34.1, 38
     See application file for complete search history.

(56) References Cited

U.S. PATENT DOCUMENTS 1,818,955 A      8/1931   Maas
3,054,141 A *   9/1962   Hammesfahr ............... 425/34.1
(Continued)

FOREIGN PATENT DOCUMENTS

EP          0448407 A2    9/1991
EP          0666165 A1    8/1995
(Continued)

OTHER PUBLICATIONS

Bridgestone Corp., "Tyre Build System With No Need to Change Supplied Members and Setters—Has Raw Tyre and Bt Band Building Lines on Loop Shaped Building Carriage Travelling Lines, With Processing Division Along Respective Travelling Lines," Patent Abstract of JP 08-011,232, filed Jun. 29, 1994.

*Primary Examiner* — Geoffrey L Knable
(74) *Attorney, Agent, or Firm* — Finnegan, Henderson, Farabow, Garrett & Dunner, L.L.P.

(57) ABSTRACT

A method of manufacturing tires includes making a plurality of structural components for tires, assembling the components following a pre-established sequence at respective work stations disposed along a manufacturing line, transferring the tires to a curing line, and curing the tires in respective vulcanization molds. The tires are sequentially transferred along the manufacturing line from a first work station to successive work stations. At least one series of tires is simultaneously processed on the manufacturing line and the curing line, and the at least one series of tires includes at least one first tire model and at least one second tire model different from the at least one first tire model. The tires are transferred from the manufacturing line to the curing line at a same rate as the tires are sequentially transferred along the manufacturing line from the first work station to the successive work stations.

17 Claims, 1 Drawing Sheet

(56) References Cited

U.S. PATENT DOCUMENTS

| | | | | |
|---|---|---|---|---|
| 3,532,577 | A | * | 10/1970 | Niclas et al. ............... 156/405.1 |
| 3,767,509 | A | * | 10/1973 | Gazuit ........................... 156/415 |
| 3,909,337 | A | * | 9/1975 | Yabe ............................. 156/416 |
| 4,134,783 | A | * | 1/1979 | Appleby et al. .............. 156/396 |
| 4,230,517 | A | * | 10/1980 | Enders .......................... 156/396 |
| 4,268,330 | A | * | 5/1981 | Komatsu et al. ............. 156/111 |
| 4,443,290 | A | | 4/1984 | Loeffler et al. |
| 4,728,274 | A | | 3/1988 | Siegenthaler |
| 4,877,468 | A | | 10/1989 | Siegenthaler |
| 4,963,207 | A | | 10/1990 | Laurent |
| 5,114,512 | A | | 5/1992 | Holroyd et al. |
| 5,622,669 | A | | 4/1997 | Dailliez et al. |
| 5,853,526 | A | * | 12/1998 | Laurent et al. ............... 156/396 |
| 5,908,531 | A | | 6/1999 | Laurent |
| 6,173,892 | B1 | * | 1/2001 | Kimijima ...................... 235/385 |
| 6,702,912 | B1 | | 3/2004 | Oku et al. |
| 6,738,686 | B2 | * | 5/2004 | Caretta et al. ................. 156/111 |
| 6,908,523 | B2 | | 6/2005 | Caretta et al. |
| 7,770,622 | B2 | * | 8/2010 | Caretta et al. ................. 156/396 |

FOREIGN PATENT DOCUMENTS

| | | |
|---|---|---|
| EP | 0875364 A2 | 11/1998 |
| EP | 0922561 A2 | 6/1999 |
| EP | 0943421 A1 | 9/1999 |
| JP | 08-011232 | 1/1996 |
| JP | 11-105155 A | 4/1999 |
| WO | WO-99/17919 A1 * | 4/1999 |
| WO | WO 00/35666 | 6/2000 |

* cited by examiner

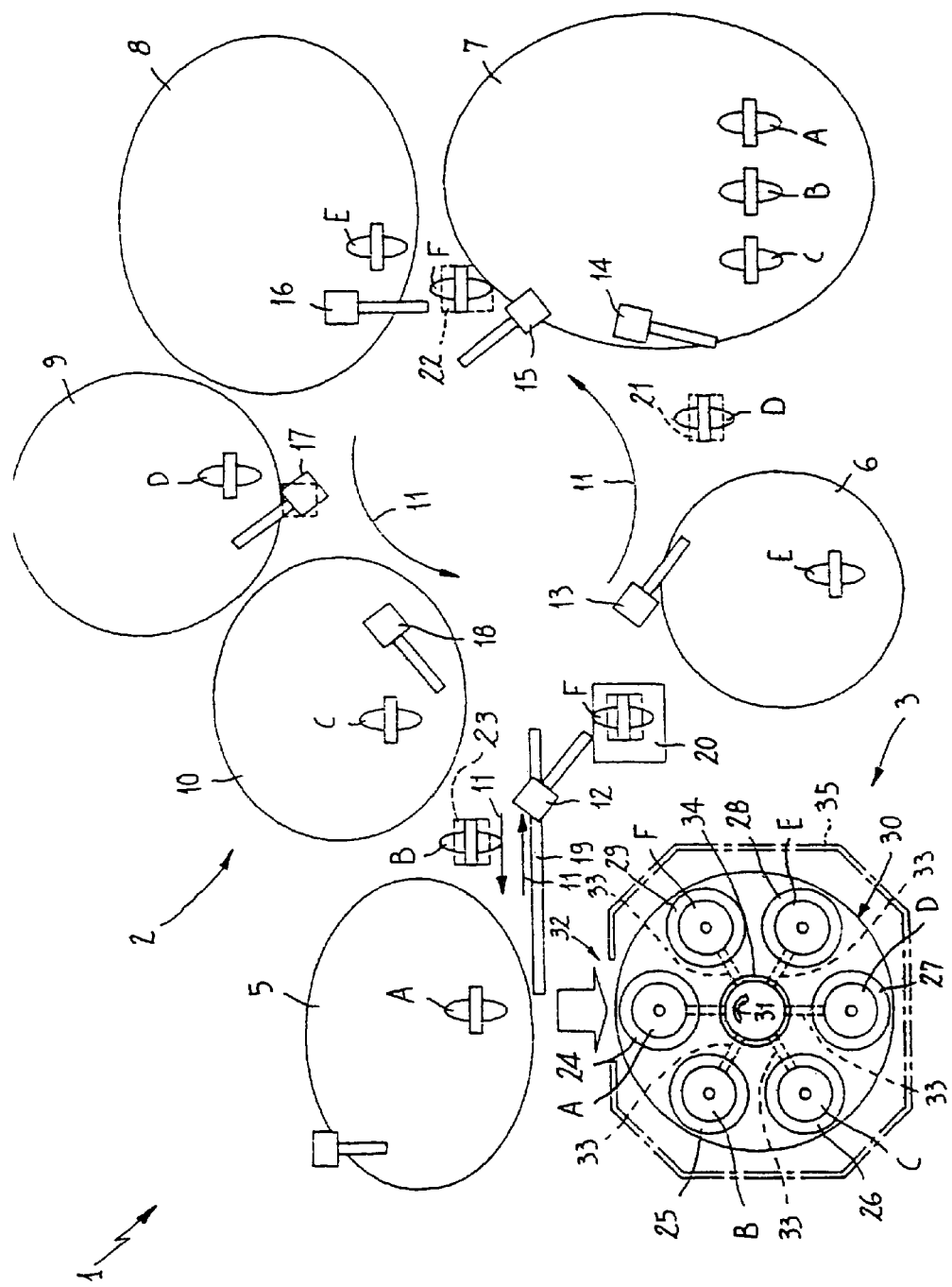

METHOD AND APPARATUS FOR MANUFACTURING DIFFERENT TYPES OF TYRES

This application is a continuation application of U.S. patent application Ser. No. 10/132,128, filed Apr. 26, 2002, in the U.S. Patent and Trademark Office ("USPTO") (now U.S. Pat. No. 7,005,023)—the content of which is relied upon and incorporated herein by reference—which is a continuation of International Patent Application No. PCT/EP00/10443, filed Oct. 24, 2000, in the European Patent Office ("EPO"); additionally, Applicants claim the right of priority under 35 U.S.C. §119(a)-(d) based on patent application No. 99830685.6, filed Oct. 29, 1999, in the EPO; further, Applicants claim the benefit under 35 U.S.C. §119(e) based on prior-filed, provisional application No. 60/173,518, filed Dec. 29, 1999, in the USPTO.

The present invention relates to a method of manufacturing tyres different from each other, of the type comprising the steps of: making a plurality of structural components for tyres under production; manufacturing the tyres by assembling the components of each of them following a pre-established sequence, at respective work stations disposed along a manufacturing line on which tyres being processed are caused to move by sequential transfer of same from each work station to the next work station; transferring the manufactured tyres to a curing line; curing the tyres in respective vulcanization moulds associated with said curing line.

It is also an object of the present invention an apparatus for manufacturing tyres different from each other, of the type comprising: a manufacturing line having a plurality of work stations, each arranged to assemble at least one respective structural component on a tyre being processed, transfer devices operating along the manufacturing line to sequentially transfer each tyre being processed from a work station to the next work station; a curing line having vulcanization moulds for the manufactured tyres.

A tyre for vehicle wheels usually comprises a carcass structure essentially consisting of one or more carcass plies substantially having a toroidal conformation and the axially opposite side edges of which are engaged with respective annular reinforcing structures incorporating circumferentially inextensible inserts usually called "bead rings". Each annular reinforcing structure is incorporated into a so-called "bead" defined along an inner circumferential edge of the tyre for anchoring of the latter to a corresponding mounting rim.

Applied to the carcass structure, at a radially outer position thereof, is a belt structure comprising one or more belt strips in the form of a closed ring, essentially made up of textile or metallic cords suitably oriented with respect to each other and to the cords belonging to the adjacent carcass plies.

In addition, applied to the belt structure, at a radially outer position thereof, is a tread band, usually comprised of a band of elastomer material of appropriate thickness.

It should be pointed out that, as regards the present description, by the term "elastomer material" it is meant a rubber blend in its entirety, i.e. a mixture formed of at least one polymeric base suitably amalgamated with reinforcing fillers and/or process additives of different types.

Applied to the opposite sides of the tyre is a pair of sidewalls, each of which covers a side portion of the tyre included between a so-called shoulder region, placed close to the corresponding side edge of the tread band, and the corresponding bead.

After the above statements, it is to be noted that each tyre model is essentially distinguishable from the others due to a plurality of physico-chemical, structural, dimensional and appearance features.

The physico-chemical features are essentially linked with the type and compositions of the materials, in particular the recipes for the different blends used in making the elastomer materials. The structural features essentially define the number and type of the structural components present in the tyre, and their mutual positioning in the tyre structure. The dimensional features refer to the geometric measurements and the profile in right section of the tyre (outer diameter, chord or maximum width, sidewall height and ratio between the latter, i.e. section ratio) and will be hereinafter merely referred to as "size". The appearance features consist of the tread pattern, ornamental motifs and different inscriptions or distinguishing marks reproduced on the tyre sidewalls and generally identified as "tread pattern" in the following of the present description.

The traditional production processes essentially contemplate four distinct steps in tyre manufacture: a) preparation of the blends, b) production of the individual structural components, c) assembling of the different structural components in succession to obtain a green carcass, d) curing of the carcass and simultaneous moulding of the tread pattern onto the outer surface of the tyre.

In an attempt to reduce production costs, the developing technology fundamentally addressed itself to the search of technical solutions that would bring to achievement of increasingly quicker and more reliable machinery, so as to minimize time necessary for producing each individual tyre, the quality of the finished product being the same or even better.

Thus plants have been accomplished which have high production capacities in terms of number of pieces produced in the time unit, by adopting manufacturing machinery having reduced possibilities of modification (i.e. capable of producing only a limited variety of tyre models), but adapted to maximize a mass production of tyres having identical structural features. By way of example only, in the most modern plants a productivity of about two carcasses per minute can be reached. Attempts have been also made for reducing or eliminating storage of the semifinished products obtained between two steps in succession of the four process steps previously listed, so as to minimize costs and involved problems each time the tyre model under production is to be changed. For instance, in document EP 922561 a method of managing tyre production is suggested in which, in order to reduce or eliminate a storage time for green tyres and therefore the number of green tyres being stocked, arrangement of a curing line having a number of moulds suitable to constantly absorb the productivity of the manufacturing line is provided. Production of tyres of different models, in particular of different sizes, is achieved by replacing and/or adapting each time the machinery arranged in the manufacturing line, concurrently with replacement of the moulds in the curing line.

It should be recognized however that, at all events, tyre production involves costs that become increasingly higher as the variety of tyre models to be produced increases: in particular interventions on the processes and/or plants for blend production are necessary in order to enable production of components with new and different physico-chemical features and/or interventions on the production plants for the individual structural components in order to change the size of the tyres being produced. Chance of the operating sequence (different assembling methodology) and/or the equipment, and adjustment of the manufacturing machinery is also required each time the structure and/or size of the tyre to be produced has been changed. Finally, availability of at least one vulcanization mould for each different "tread pattern-size" pair is required.

The above involves heave costs for purchasing moulds of different sizes and different tread patterns, as well as different equipment, costs due to non-saturation of same, losses in productivity due to machine downtime (changing of a process or equipment generally involves machine downtime), and machine shop rejections. For instance, in the case of continuously produced components, due to downtime of the downstream plants and/or change in the component features, an excess in production is generated that often must be discarded, its reuse being impossible.

Under this circumstance, a person skilled in the art aiming at minimizing costs generally advises against production of a great number of tyre models on one and the same plant. In fact the cost-minimizing objective is inconsistent with a frequent change of equipment and production processes. Where sale volumes of each model are rather high, there is a tendency to multiply the number of the productive plants so as to make it possible to continuously produce a different model on each plant, thereby succeeding in minimizing the above drawbacks. On the other hand, where the expected sale volumes for given models are not particularly high, on an annual basis for example, it is at all events preferred to continuously make the whole production of at least one year immediately, for the purpose of controlling the production cost. This system however may adversely affect the quality of the product sold and increases warehouse costs, because the goods are stored for a long period of time. In addition, sale risks are increased due for example to an unexpected quick obsolescence of the product, and there is an increase in financial costs for capital locking up as a result of the product remaining in stock and the non-saturation of the moulds that are only used for the limited period of time required for execution of the estimated reduced volume.

In order to cope with the above problems, the Applicant has already set up a productive method according to which each series of tyres under production, identical with each other, is divided into daily batches each comprising an amount of tyres adapted to fill the daily productivity of the moulds. In this way production of tyres of different sizes and/or different constructional features is optimized, storage of great amounts of green and vulcanized tyres being eliminated. This method is described in the European Patent Application No. EP 875364 to which please refer for further possible information.

In accordance with the present invention, further improvements have been surprisingly achieved, above all in terms of operating flexibility of the tyre-production plant, by carrying out simultaneous working of different types of tyres both on the manufacturing line and on the curing line, and performing transfer of green tyres to the curing line at the same rate as the transfer rate of the tyres themselves between the different stations arranged along the manufacturing line.

In more detail, it is an object of the present invention to provide a method of manufacturing tyres different from each other, characterized in that in each of said manufacturing line and curing line at least one series of tyres comprising at least one first and one second models of tyres different from each other is simultaneously processed, tyre transferring from the manufacturing line to the curing line being carried out at the same rate as the transfer rate of the tyres to each of said work stations.

Advantageously, production of each structural component is carried out on a manufacturing line by working at least one base semifinished product which is identical for each tyre model, supplied in a predetermined amount depending on the tyre model to be made.

It is further preferably provided that assembling of each structural component should be carried out before completing manufacture of a homologous component intended for an immediately following tyre under production.

In particular, assembling of the structural components of each tyre is preferably carried out on a toroidal support the shape of which substantially matches the inner conformation of the tyre itself.

In a preferential embodiment, during the manufacturing step each toroidal support is supported and transferred between at least two contiguous work stations by a robotized arm.

It is further preferably provided that each tyre should be transferred along the curing line together with the corresponding toroidal support.

Advantageously, accomplishment of at least one of said structural components is directly carried out on the tyre being processed concurrently with said assembling step.

In a preferential embodiment, accomplishment of each structural component is preceded by a step of identifying the model of the tyre being processed transferred to the corresponding work station.

In more detail, the identification step is conveniently carried out by reading a code associated with a support member of the tyre being processed.

In at least one of said work stations assembling of a plurality of structural components is preferably carried out at respective working units.

In addition and advantageously, said manufacturing line extends over a closed-loop path along which the tyres being processed are caused to move.

In more detail, the vulcanization moulds are conveniently moved over a closed-loop path along the curing line, transferring of each tyre to the curing line being executed after removal of a previously cured tyre.

Advantageously, said at least one first and one second tyre models follow each other in an identical sequence along the manufacturing line and curing line.

It is a further object of the invention to provide an apparatus for manufacturing tyres different from each other, characterized in that each of said work stations is arranged to assemble said at least one structural component selectively on at least one first and one second tyre model being part of at least one series of tyres being simultaneously processed along the manufacturing line, and said curing line comprises at least one series of vulcanization moulds of a number corresponding to the amount of tyres included in said at least one series of tyres being processed on the manufacturing line, said transfer devices also operating between the manufacturing line and curing line to transfer the manufactured tyres to said curing line, following the same transfer rate as that for transferring the tyres to each of the work stations disposed along the manufacturing line.

Advantageously, each of said work stations comprises feeding devices to supply at least one base element for making said at least one structural tyre component, and application devices for applying said structural component to the tyre being processed, said structural component being made using said base element in a predetermined amount depending on the tyre model to be manufactured.

In a preferential embodiment, associated with each of said work stations are devices for identifying the model of the tyre being processed in the work station itself, and selection devices to establish the amount of base elements to be used for making the structural component of the tyre being processed.

In more detail, said identification devices comprise at least ore sensor disposed on the manufacturing line and arranged to read at least one code associated with a support member of each tyre being processed.

In addition, preferably provided is also the presence of a plurality of toroidal supports each arranged to engage the structural components of a tyre being processed.

Advantageously, said transfer devices operate on individual toroidal supports to sequentially transfer each tyre being processed between the work stations disposed along the manufacturing line, and to the curing line.

In a preferential embodiment, said transfer devices comprise at least one robotized arm associated with at least one of said work stations.

At least one of said robotized arms preferably comprises grip and control members operating on a toroidal support to hold it up in front of the respective work station and drive it in rotation around a geometric axis thereof during assembling of said at least one structural component.

It may be also provided that at least one of said work stations should comprise a plurality of working units, each intended for assembling one respective structural component to each tyre being processed.

In the presence of a plurality of support members each arranged to hold up one tyre being processed, the transfer devices preferably operate on the support members to move them along the manufacturing line following a closed-loop path.

In a preferential embodiment, the curing line comprises at least one turntable carrying said vulcanization moulds and operable in rotation in a step-by-step movement to sequentially bring each vulcanization mould to a loading-unloading station of the tyres being processed.

Said turntable can be conveniently enclosed in an insulating holding structure, said transfer devices operating through an access opening arranged in the holding structure itself.

Preferably, the curing line further comprises stem-feeding devices connected with a central column of the turntable and leading to the individual moulds through connecting ducts extending from said central column.

Further features and advantages will become more apparent from the detailed description of a preferred but non-exclusive embodiment of a method and an apparatus for manufacturing tyres different from each other, in accordance with the present invention. This description will be taken hereinafter with reference to the accompanying drawing, given by way of example, in which the only FIGURE shows a lay-out of the subject apparatus, generally denoted by reference numeral 1.

Apparatus 1 essentially comprises a manufacturing line 2 on which each tyre being processed is manufactured by assembling structural components of said tyre in a pre-established sequence, and a curing line 3 on which each tyre from the manufacturing line 2 is cured within a respective mould 24, 25, 26, 27, 28, 29.

The manufacturing line 2 essentially comprises a plurality of work stations 5, 6, 7, 8, 9, 10 disposed after each other along a manufacturing path, preferably in the form of a closed loop and represented, just as an indication, by arrows 11 in the drawing.

The work stations 5, 6, 7, 8, 9, 10 lend themselves to operate simultaneously, each on at least one tyre being processed for assembling at least one of its structural components thereon.

In more detail, during the assembling steps the different structural components employed in making each tyre A, B, C, D, E, F are conveniently engaged on a support member, preferably consisting of a toroidal support the shape of which substantially matches the inner conformation of the tyre to be obtained. This toroidal support is preferably of the collapsible type or it is adapted to be divided into a plurality of sectors, so that it can be easily removed from the tyre when processing is over.

In accordance with the present invention, both in the manufacturing line 2 and the curing line 3, simultaneous processing of a least one first and one second tyre models is carried out. By way of example, in the lay-out depicted in the drawing, simultaneous processing of six different tyre models is carried out, which models differ from each other as regards their dimensional features. However a different number of models can be acted upon, which models in addition to or as an alternative to dimensional differences, may have differences in terms of structural and/or physico-chemical features and/or appearance features.

In the diagram shown in the FIGURE, the toroidal supports are represented without distinction from the tyres being processed on which they are engaged, and they are marked by letters A, B, C, D, E, F, respectively, each letter marking a specific tyre model.

As can be seen, the tyres being processed are distributed along the manufacturing line 2 to form one or more series in each of which the different models A, B, C, D, E, F follow each other in a pre-established sequence which is the same for all series. In the example shown, two series are distributed alone the manufacturing line 2 and each of them comprises six tyres A, B, C, D, E, F, different from each other. Therefore, twelve toroidal supports altogether on each of which a respective tyre is manufactured are simultaneously managed on the manufacturing line 2.

It is to be pointed out that in the present description by the term "series" it is meant any assembly of tyres of different models following each other in any pre-established sequence. Therefore, in the manufacturing line 2, for example, six series each made up of two different tyre models cyclically coming after each other according to sequence A, B-A, B may be provided, or provision may be made for three series each made up of a tyre of a first model alternated with two tyres of a second model, according to sequence A, B, A-A, B, A.

Transfer devices 12, 13, 14, 15, 16, 17, 18 operate on the manufacturing line 2 to sequentially transfer each of the tyres being processed A, B, C, D, E, F from one work station 5, 6, 7, 8, 9, 10, to the next work station, so as to cause sequential assembling of all tyre components, said tyre being then transferred to the curing line 3.

Preferably, these transfer devices 7 comprise one or more robotized arms 12, 13, 14, 15, 16, 17, 18 each of which is associated with at least one of the work stations 5, 6, 7, 8, 9, 10 and is adapted to operate on the individual toroidal supports A, B, C, D, E, F to carry out sequential transfer of each tyre being processed.

More particularly, in the embodiment shown, a first robotized arm 12 is provided which is possibly movable along a guide structure 19 and operates between the manufacturing line 2 and curing line 3, to pick up a finished tyre from the latter and transfer it to a first work station 5, where the tyre is removed from the respective toroidal support A through disassembling of said support. In the first work station 5, the toroidal support A is subsequently reassembled to be then transferred, still by the first robotized arm 12, to a stand-by station 20 from which it will be picked up for subsequent use in the manufacture of a new tyre.

In the example shown, in the first stand-by station there is a toroidal support which is ready to process a different tyre model F.

A second robotized arm 13 bends itself to carry out transfer of the toroidal support F from the first stand-by station 20 to a second work station 6 where assembling of the first components for tyre construction is carried out. In the example shown, in the second work station 6 the tyre being processed is model E. The assembling operation may, for example, involve coating of the outer surface of the toroidal support with a thin layer of elastomer material impervious to air, usually called "liner", as well as application of optional elastomer bands close to the regions corresponding to the tyre beads, and/or formation of an additional coating layer of elastomer material, placed on top of the liner.

Preferably, in the second work station 6, as well as in the remaining work stations 7, 8, 9, 10, formation of each structural component of the tyre is carried out concurrently with the above described assembling step, by processing at least one semifinished base product, which is the same for each tyre model A, B, C, D, E, F and is supplied in a predetermined amount depending on the tyre model to be made.

For the purpose, each of the work stations 5, 6, 7, 8, 9, 10 is provided with one or more working units (not shown), each of which essentially comprises feeding devices adapted to supply the required base element for accomplishment of the corresponding structural component and operating in combination with application devices for applying the base element and/or the obtained structural component to the tyre being processed.

In particular, in the second work station 6 accomplishment of the liner, the elastomer bands and/or the additional coating layer may be advantageously carried out by winding up on the toroidal support E being processed, at least one strip-like element of elastomer material having a width approximately included between 0.5 and 3 cm, to form coils disposed consecutively in side by side relationship and optionally also at least partly overlapped on each other, said strip-like element coming directly from a respective extruder, a reel or equivalent feeding devices associated with the second work station 6.

Winding-up of coils may be advantageously simplified by entrusting the second robotized arm 13 with the task of supporting, by appropriate grip and control members, the toroidal support E, and driving it in rotation around its own axis, suitably moving it in front of pressure rollers or equivalent application devices (not described as they can be made in any convenient manner by a person skilled in the art) combined with the feeding devices, so as to cause a correct distribution of the strip-like band with respect to the outer surface of the toroidal support.

For more details on the modalities of application of the structural components to a toroidal support with the aid of a robotized arm, please refer to the co-pending European Patent Application No. 98830762.5 in the name of the same Applicant, content of which is considered as herein completely incorporated. For example, rotation and movements of the toroidal support are preferably carried out by a robotized arm carrying the toroidal support itself. The transverse-distribution displacements may be carried out by moving the toroidal support according to at least five axes of oscillation. In particular, a robotized arm may include a first section having a first end rotatably connected to a support platform according to first and second oscillation axes perpendicular to each other; a second section connected to a second end of the first section in an oscillating manner according to a third and a fourth oscillation axes perpendicular to each other; an end head arranged to engage rotatably and preferably in overhanging the toroidal support around the geometric rotation axis of the former, and connected to the second section in an oscillating manner at least according to a fifth axis of oscillation perpendicular to said fourth oscillation axis. In more detail, said end head is in addition susceptible of oscillation around at least one sixth axis perpendicularly oriented with respect to the fifth oscillation axis.

When assembling of the components in the second work station 6 has been completed, the second robotized arm 13 lays down the toroidal support with the respective tyre which is being manufactured in a second stand-by station 21 that in the FIGURE is occupied by a D-model toroidal support, previously processed in the second station itself.

A third robotized arm 14 picks up the toroidal support D from the second stand-by station 21 to transfer it to a third work station 7, where assembling of the structural components cooperating in forming the structure of the tyre carcass is carried out.

In more detail, in the third work station 7 manufacture and assembling of one or more carcass plies is carried out, as well as of a pair of annular reinforcing structures for the regions corresponding to the tyre beads. In the same manner as said with reference to the operating steps executed in the second work station 6, each of these structural components is directly made during the assembling step, using a semifinished base product supplied in a pre-established amount depending on the model of the tyre being processed.

For instance, the carcass ply or plies can be formed by sequentially laying down on the toroidal support, a plurality of strip-like sections individually cut from a continuous strip-like element made up of rubberized cords parallel to each other. Each annular reinforcing structure can, in turn, comprise a circumferentially inextensible insert consisting for example of at least one thread-like metal element wound up in several radially-superposed coils, as well as a filling insert of elastomer material to be obtained by application of an elongated elastomer element wound up to form several coils disposed in axial side by side relationship and/or in radial-superposition relationship.

Each of said continuous strip-like element, thread-like metal element and elongated elastomer element forming the semifinished base product to be used in a pre-established amount for manufacture of the respective structural component may directly come from an extruder, a reel or equivalent feeding devices associated with the third work station 7.

For further explanations as regards the manufacture modalities of the carcass structure, please refer to the European Patent Application No. 98830472.1 in the name of the same Applicant, content of which is considered as herein completely incorporated.

In the diagram in the FIGURE the third work station 7 is arranged to make carcass structures for very high-performance tyres, in case of need, as described in the European Patent Application No. 98830662.7 in the name of the same Applicant as well. The carcass structure described in this patent application comprises two carcass plies each made up of a first and a second series of strip-like sections laid down on the toroidal support in an alternate sequence. Also arranged in each tyre bead is a pair of annular reinforcing structures of the previously described type, each inserted between the end flaps of the sections belonging to the first and second series respectively and forming one of the carcass plies, as well as an inextensible insert externally applied with respect to the second carcass ply.

To facilitate sequential assembling of the different structural components following the pre-established order, the third work station 7 is provided to be equipped with at least three different working units intended for laying down the strip-like sections, thread-like metal element and elongated elastomer element respectively, and each simultaneously operating on a respective tyre being processed. As a result, in the third work station 7 three tyres A, B, C will be simultaneously processed, each of them being sequentially transferred from one of the working units to the other, until completion of the carcass structure. Sequential transferring of the tyres to the different working units arranged in the third station 7 can be carried out by the third robotized arm 14, optionally with the aid of a fourth robotized arm 15 and/or possible auxiliary transfer devices.

When accomplishment of the carcass structure has been completed, the fourth robotized arm 15 lays down the toroidal support on a third stand-by station 22 that in the FIGURE is engaged by an F-model toroidal support.

A fifth robotized arm 16 picks up the toroidal support F from the third stand-by station 22 to carry it to a fourth work station 8 that in the example shown is occupied by an E-model toroidal support. In the fourth work station 8 manufacture and assembling of the structural components adapted to define the so-called belt structure of the tyre are carried out. In particular, a first working unit arranged in the fourth work station 8 makes, directly on the previously formed carcass structure, two under-belt bands circumferentially extending in the shoulder regions of the tyre. These under-belt bands can be directly extruded from an extruder and applied with the aid of pressure rollers or equivalent application devices.

A second working unit forms a first and a second belt layers on the carcass structure, each layer beans formed by sequential deposition of ribbon-like sections disposed circumferentially in side be side relationship and each obtained by cutting to size a continuous ribbon-like element made up of a plurality of cords disposed parallelly in side by side relationship and incorporated into an elastomer layer. A further working unit causes formation of a further belt layer by winding up a continuous cord in coils disposed in axial side by side relationship and in radial superposition with the underlying belt layers.

Further details on a possible modality for manufacture of the belt structure are described in the European Patent Application No. 97830633.0 in the name of the same Applicant, to be considered as herein completely incorporated.

When manufacture of the belt structure has been completed, the fifth robotized arm 16 transfers the tyre being processed to a fifth work station 9 that in the example shown is occupied by a D-model toroidal support. In the fifth work station 9 the toroidal support D is engaged by a sixth robotized arm 17 with the aid of which application of a tread band is carried out, said tread band being obtained by winding up a further elastomer ribbon-like element in coils disposed consecutively in side by side relationship and superposed until achievement of a tread band of the desired conformation and thickness.

The tyre is subsequently transferred to a sixth work station 10, occupied in this example by a C-model toroidal support. In the sixth work station 10 the toroidal support C is engaged by a seventh robotized arm 18 causing appropriate handling of same in front of respective working units to carry out application of abrasion-resistant elements to the regions corresponding to the beads, as well as application of the sidewalls, which can be also obtained by winding up at least one elastomer band to form coils disposed in side by side and/or superposed relationship.

When this operation is over, the seventh robotized arm 18 lays down the manufactured tyre on an end stand-by station 23, occupied, in this example, by a B-model toroidal support, before transfer of the tyre itself to the curing line 3.

In the light of the above it is well apparent that, due to the processing modalities of the individual tyres A, B, C, D, E, F along the manufacturing line 2, assembling of each structural component advantageously takes place before manufacture of a homologous component, intended for a tyre A, B, C, D, E, F under production coming immediately after it, has been completed. Due to this preferential feature of the invention, advantageously tyre manufacture takes place in the complete absence of semifinished products to be kept in stock and consequently an immediate adaptation of each working unit to the tyre model A, B, C, D, E, F each time transferred to the respective work station 5, 6, 7, 8, 9, 10 can be carried out, without involving any material waste.

It should be also pointed out that operation of each of the working units arranged in the individual work stations 5, 6, 7, 8, 9, 10, as well as of each of the robotized arms 12, 13, 14, 15, 16, 17, 18 is managed by at least one programmable electronic control unit capable of suitably controlling the amount of the delivered semifinished base products and the movements imposed to the toroidal support in order to ensure correct formation of the individual structural components of the tyres A, B, C, D, E, F being processed. In particular, this electronic control unit can be programmed in such a manner that operation of the working units of the robotized arms can be adapted to the tyre model A, B, C, D, E, F, each time processed in each individual work station 5, 6, 7, 8, 9, 10.

To give more operating flexibility to the plant, so that it is not bound to predetermined sequences of different tyre models, devices for identifying the tyre model being processed are preferably provided to be associated with each of the work stations 5, 6, 7, 8, 9, 10, said identification devices cooperating with selection devices for determining the amount of base elements to be used for making each structural component in the concerned work station. For instance, these identification devices can advantageously be comprised of a bar code or other code type reader associated with the toroidal support of the tyre A, B, C, D, E, F, interfaced with the electronic control unit to determine selection of the amount of semifinished products depending on previously keyed in value tables. Consequently, as soon as a tyre A, B, C, D, E, F is transferred to any of the work stations 5, 6, 7, 8, 9, 10, the bar code reader identifies the model to which the tyre itself belongs, thus enabling the electronic control unit to conveniently set the operating program of the work station itself.

The curing line 3 advantageously comprises at least one series of vulcanization moulds 24, 25, 26, 27, 28, 29 of the same number as the amount of tyres included in said at least one series of tyres A, B, C, D, E, F being processed on the manufacturing line 2. In the example show, six vulcanization moulds 24, 25, 26, 27, 28, 29 are provided, each of them corresponding to the size of one of the tyre models A, B, C, D, E, F manufactured along the manufacturing line 2.

Preferably, moulds 24, 25, 26, 27, 28, 29 are mounted on a turntable 30 to be driven in rotation in a step-by-step movement in the direction stated by arrow 31, so as to make the moulds carry out a closed-loop path along the curing line 3, sequentially carrying them, one after the other, to a loading-unloading station 32 of the tyres being processed.

Moulds 24, 25, 26, 27, 28, 29 are each fed with steam under pressure through a respective connecting duct 33 radially extending from a central column 34 into which steam-feeding devices consisting for example of a boiler are integrated or otherwise connected. The whole turntable 30 can be advantageously enclosed within an insulated structure 35 having at least one access opening disposed at the loading-unloading station 32, so as to avoid excessive heat losses to the outside.

Advantageously, transfer of the individual tyres being processed A, B, C, D, E, F to the respective moulds 24, 25, 26, 27, 28, 29 is carried out by the transfer devices 7 at the same rate as that for transferring the tyres themselves to each of the work stations 5, 6, 7, 8, 9, 20, distributed along the manufacturing line.

For the purpose, starting from the situation depicted in the FIGURE, turntable 30 carries out a rotation step to bring mould 25, adapted to receive a B-model tyre disposed in the end stand-by station 23, to the loading-unloading station 32.

The first robotized arm 12, after transferring the toroidal support, model A, to the first stand-by station 20, picks up from mould 25, the cured tyre B together with the respective toroidal support to lay it down into the first manufacturing station 5 for the purpose of removing it from said toroidal support. The first robotized arm 12 then picks up the green tyre B from the end stand-by station 23 together with the respective toroidal support to transfer it into the corresponding vulcanization mould 25. Mould 25 is closed and fed with steam under pressure through the respective connecting duct 33, to submit tyre B to the curing step. Cyclic repetition of these operations causes a plurality of tyres A, B, C, D, E, F of different models to be simultaneously processed on the curing line, said tyres following each other at the same sequence than that detectable along the manufacturing line 2.

From the above description it is apparent that according to the subject method and apparatus, handling of tyres A, B, C, D, E, F being processed is advantageously managed in the form of a continuous flow where the manufacturing line 2 is directly connected with the curing line 3, causing sequential transfer of the individual tyres A, B, C, D, E, F at the same rate as that of transfer of said tyres between the different work stations 5, 6, 7, 8, 9, 10 on the manufacturing line 2, thereby advantageously eliminating the necessity to accumulate green tyres in storage units arranged between the manufacturing line and curing line.

The tyre transfer rate will be determined on the basis of the working time employed for completing assembling of the respective structural components by the working units operating in the individual manufacturing stations 5, 6, 7, 8, 9, 10, or at all events the working unit that, as compared with the others, requires the longest period of time for terminating the assembling operations for which it is intended.

On the whole, said working time and consequently the transfer rate are established depending on the number of movement steps provided along the curing line 3, so that each tyre A, B, C, D, E, F may stay in the curing line itself at least for a period of time sufficient to complete the curing process.

Just as an indication, in the example shown where six vulcanization moulds 24, 25, 26, 27, 28, 29 are provided, the working time and transfer rate may be provided to have a value in the order of 2.5 minutes, so that each mould will stay in the curing line 3 a time corresponding to about 15 minutes, during which it will travel along the whole curing line carrying out six movement steps. If required, the real time of the vulcanization process carried out on the individual tyres A, B, C, D, E, F may be at all events reduced, by for example delaying steam admission to the mould 24, 25, 26, 27, 28, 29 after the tyre has been introduced thereinto. It is therefore advantageously possible to establish real vulcanization times different from each other for the different tyre models.

The present invention also enables downtime to be eliminated or at all events minimized, every time replacement of a tyre model under production is carried out.

In fact, in this case, only replacing of the toroidal supports and vulcanization mould adapted for production of a model with toroidal supports and vulcanization mould adapted for production of the new model is required. This replacing operation, which on the other hand is only necessary where there is a change in the dimensional features and/or the tread pattern, has a minimum impact on productivity, not exceeding the non-production of one tyre. This is in fact the time required to enable a mould to be replaced in the curing line, making the mould itself carry out a "loadless" cycle in the curing line and the manufacturing line, respectively.

Therefore the invention also makes it possible to produce tyres in batches of very small amounts, even a few units, in a convenient manner, without involving important increases in the unit cost of the tyres themselves.

The invention claimed is:

1. An apparatus for manufacturing tyres, comprising:
    a manufacturing line comprising a plurality of work stations;
    first transfer devices operating to sequentially transfer each tyre along the manufacturing line from a first work station to successive work stations;
    a curing line comprising vulcanization moulds for the tyres;
    a second transfer device operating to transfer tyres from the manufacturing line to the curing line; and
    at least one stand-by station in between at least two of the plurality of work stations for temporarily storing a toroidal support of the tyre being processed, the toroidal support being transferred along the manufacturing line;
    wherein each work station is arranged to selectively assemble at least one structural component on at least one first tyre and at least one second tyre,
    wherein the at least one first tyre and the at least one second tyre are of different models,
    wherein the at least one first tyre and the at least one second tyre belong to at least one series of tyres being simultaneously processed on the manufacturing line,
    wherein the curing line comprises at least one series of vulcanization moulds, wherein each of the at least one series of vulcanization moulds consists of a number of vulcanization moulds corresponding to a total number of tyres included in each of the at least one series of tyres,
    wherein the second transfer device transfers the tyres from the manufacturing line to the curing line at a same rate as the first transfer devices sequentially transfer the tyres along the manufacturing line from the first work station to the successive work stations,
    wherein the first transfer devices comprise at least one robotized arm configured to rotate around at least five different axes of oscillation and associated with at least one of the work stations, and
    wherein one or more of the robotized arms comprises grip and control members configured to hold the toroidal support at the respective work station and to drive the toroidal support in rotation around a geometric axis of the toroidal support during assembling of the at least one structural component.

2. The apparatus of claim 1, wherein each work station comprises:
    feeding devices to supply at least one base element for making the at least one structural component; and
    application devices for applying the at least one structural component to the tyre being processed;

wherein the at least one structural component is made using the at least one base element in a predetermined amount depending on the model of the tyre being processed.

3. The apparatus of claim 2, wherein each work station further comprises:
one or more devices for identifying the model of the tyre at the workstation; and
one or more selection devices for establishing the predetermined amount of the at least one base element to be used in making the at least one structural component.

4. The apparatus of claim 3, wherein the one or more identifying devices comprise at least one sensor,
wherein the at least one sensor is disposed on the manufacturing line, and
wherein the at least one sensor is arranged to read at least one code associated with the toroidal support of the tyre being processed.

5. The apparatus of claim 1, wherein the toroidal support is arranged to engage the at least one structural component of a tyre being processed.

6. The apparatus of claim 5,
wherein the second transfer device operates on the toroidal support.

7. The apparatus of claim 1, wherein the second transfer device comprises a robotized arm.

8. The apparatus of claim 1, wherein at least one of the work stations comprises a plurality of working units, and
wherein each working unit assembles one structural component for the tyre being processed.

9. The apparatus of claim 1,
wherein the first transfer devices operate on the toroidal support to move the toroidal support along the manufacturing line over a closed-loop path.

10. The apparatus of claim 1, wherein the curing line further comprises at least one turntable holding the vulcanization moulds, and
wherein the at least one turntable is operable in a step-by-step rotation movement to sequentially bring each vulcanization mould to a loading-unloading station.

11. The apparatus of claim 10, wherein the turntable is enclosed in an insulating holding structure, and
wherein the second transfer device operates through an access opening arranged in the holding structure.

12. The apparatus of claim 10, wherein the curing line further comprises steam-feeding devices connected with a central column of the turntable, and
wherein the steam-feeding devices lead to the vulcanization moulds through connecting ducts extending from the central column.

13. The apparatus of claim 10, wherein each of the number of vulcanization moulds is configured to enclose the at least one tyre along with a respective toroidal support.

14. The apparatus of claim 1, wherein each work station comprises:
feeding devices to supply at least one base semifinished product which is identical for each model of tyre, for making the at least one structural component; and
application devices for applying the at least one structural component to the tyre being processed;
wherein the at least one structural component is made using the at least one semifinshed product in a predetermined amount depending on the model of the tyre being processed.

15. The apparatus of claim 1, wherein the grip and control members are configured to lay down the toroidal support.

16. The apparatus of claim 1, wherein the at least one first tyre and the at least one second tyre follow each other in a pre-established sequence along the manufacturing line,
wherein the at least one first tyre and the at least one second tyre are simultaneously processed on the curing line, and
wherein said at least one first tyre and the at least one second tyre in the curing line follow each other in the pre-established sequence.

17. An apparatus for manufacturing tyres, comprising:
a manufacturing line comprising a plurality of work stations;
first transfer devices operating to sequentially transfer each tyre along the manufacturing line from a first work station to successive work stations;
a curing line comprising vulcanization moulds for the tyres;
a second transfer device operating to transfer tyres from the manufacturing line to the curing line; and
at least one stand-by station in between at least two of the plurality of work stations for temporarily storing a toroidal support of the tyre being processed, the toroidal support being transferred along the manufacturing line;
wherein each work station is arranged to selectively assemble at least one structural component on at least one first tyre and at least one second tyre,
wherein the at least one first tyre and the at least one second tyre are of different models,
wherein the at least one first tyre and the at least one second tyre belong to at least one series of tyres being simultaneously processed on the manufacturing line,
wherein the curing line comprises at least one series of vulcanization moulds, wherein each of the at least one series of vulcanization moulds consists of a number of vulcanization moulds corresponding to a total number of tyres included in each of the at least one series of tyres,
wherein the second transfer device transfers the tyres from the manufacturing line to the curing line at a same rate as the first transfer devices sequentially transfer the tyres along the manufacturing line from the first work station to the successive work stations,
wherein the first transfer devices comprise at least one robotized arm configured to rotate around at least five different axes of oscillation and associated with at least one of the work stations,
wherein one or more of the robotized arms comprises grip and control members configured to hold the toroidal support at the respective work station and to drive the toroidal support in rotation around a geometric axis of the toroidal support during assembling of the at least one structural component, and
wherein each of the number of vulcanization moulds is configured to enclose the at least one tyre along with a respective toroidal support.

* * * * *